United States Patent
Bhogal et al.

(10) Patent No.: US 8,285,790 B2
(45) Date of Patent: Oct. 9, 2012

(54) VIRTUAL UNIVERSE AVATAR ACTIVITIES REVIEW

(75) Inventors: Kulvir S. Bhogal, Fort Worth, TX (US); Rick A. Hamilton, II, Charlottesville, VA (US); Clifford A. Pickover, Yorktown Heights, NY (US); James W. Seaman, Falls Chruch, VA (US)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 12/238,529

(22) Filed: Sep. 26, 2008

(65) Prior Publication Data

US 2010/0082798 A1  Apr. 1, 2010

(51) Int. Cl.
    *G06F 15/16* (2006.01)
(52) U.S. Cl. ........ 709/205; 709/227; 709/219; 709/244; 709/217; 709/218
(58) Field of Classification Search .................. 709/205, 709/219, 224, 227, 217, 218
    See application file for complete search history.

(56) References Cited

U.S. PATENT DOCUMENTS

| | | | |
|---|---|---|---|
| 5,675,510 A | 10/1997 | Coffey et al. | |
| 5,796,952 A | 8/1998 | Davis et al. | |
| 6,052,730 A | 4/2000 | Felciano et al. | |
| 7,293,235 B1 * | 11/2007 | Powers et al. | 715/706 |
| 2003/0050988 A1 | 3/2003 | Kucherawy et al. | |
| 2005/0228865 A1 * | 10/2005 | Hirsch | 709/206 |
| 2007/0250901 A1 * | 10/2007 | McIntire et al. | 725/146 |
| 2008/0084473 A1 * | 4/2008 | Romanowich | 348/135 |
| 2009/0183089 A1 * | 7/2009 | Leahy et al. | 715/757 |
| 2009/0287405 A1 * | 11/2009 | Liu et al. | 701/119 |
| 2010/0105484 A1 * | 4/2010 | Horneff et al. | 463/43 |
| 2011/0181607 A1 * | 7/2011 | Sterchi et al. | 345/474 |

FOREIGN PATENT DOCUMENTS

WO  2005099225  10/2005

* cited by examiner

*Primary Examiner* — Lan-Dai T Truong

(74) *Attorney, Agent, or Firm* — Patrick J. Daugherty; Driggs, Hogg, Daugherty & Del Zoppo Co., LPA

(57) ABSTRACT

Methods, services, program products and devices are provided for tracking avatar activities within a virtual universe domain. A proximity threshold of an avatar is defined with respect to proximity to an artifact located within a virtual universe domain. Activity by the avatar within the virtual universe domain is tracked, with activity data generated from the tracking. The activity data is analyzed to determine proximity of the avatar to the artifact within the proximity threshold, and a report is generated from the analyzing, the report noting a determined proximity of the avatar to the artifact within the proximity threshold. In one aspect, the report is provided to a supervisory entity.

22 Claims, 3 Drawing Sheets

_US 8,285,790 B2_

VIRTUAL UNIVERSE AVATAR ACTIVITIES REVIEW

FIELD OF THE INVENTION

The present invention generally relates to tracking and reporting the activities of avatars in a virtual universe (VU), in one aspect enabling supervision of avatar activities.

BACKGROUND OF THE INVENTION

A Virtual Universe (VU) is a computer-based simulated world or environment; other terms for VU's include metaverses, "3-D Internet" and Virtual World, and VU will be understood to represent any of these environments. Users inhabit and traverse a VU, and interact with other VU users through the use of an avatar, a graphical representation of the user often taking the form of a cartoon-like human though any two or three dimensional graphic image or rendering may be utilized. In order to participate within or inhabit a VU a user creates an agent which functions as the user's account, and upon which the user builds an avatar tied to an inventory of assets the user owns in the VU and associated with the agent.

Many VU's are represented using three dimensional (3-D) graphics and landscapes and are populated by many thousands of users or "residents," wherein the VU often resembles a real world or a fantasy/fictional world in terms of physics, houses, landscapes and in interpersonal communications with other user avatars. VU environments generally comprise a variety of man-made or computer application-generated artifacts, in one aspect representative of items understood and recognized by users through their experiences in the real world as well, as through fictional experiences. An artifact may be a tangible item engaged by an avatar or otherwise defining an environmental context of or setting for an avatar, including geographic features such as walkways and streets, buildings (stores, casinos, etc.), parks, plazas, atriums. Tangible artifacts may also include fantastical and expressionistic items and settings not known or experienced in the real-world, for example including artifacts representative of other real or imagined planets, of hell or heaven, or of worlds of fictional literature and the arts. Artifacts may also define personal property items, with illustrative but not exhaustive examples including motorcycles, tokens, guns, clothing, as well as fantasy world weapons, potions, spacesuits, armor, etc. Artifacts may also include avatars engaged in a VU, said avatar artifacts sometimes representing users or automated applications (for example, an automaton greeter programmed to request user information inputs); accordingly, avatar artifacts may evince or comprise a wide variety of visual and behavioral attributes, evidencing real-life human-like appearances and behaviors as well as fantastical powers, weapons or character appearances.

Large robust VU's and massively multiplayer online games, such as for example Second Life® (SECOND LIFE is a trademark of Linden Research, Inc. in the United States and/or other countries), Entropia Universe™ (ENTROPIA UNIVERSE is a registered trademark of MindArk PE AB in the United States, other countries, or both), The Sims Online™ (THE SIMS ONLINE is a trademark of Electronic Arts, Inc. in the United States, other countries, or both), and There™ (THERE is a trademark of Makena Technologies, Inc. in the United States, other countries, or both) render and display detailed, large and complex graphic environments within which users may travel and participate as if a character in an expressionistic or fantastical fictional world or within a realistic or representational approximation of real life.

A VU may also be defined with respect to multiple VU regions, virtual areas of land within the VU often residing on a single server, with each region amenable to provision and management by a one or more participating providers. The size and complexity and variety of resources found in a VU may be directly related to a number of providers participating and hosting regions through server hosting, and the success of a VU may depend upon attracting users and keeping them engaged and participating in the VU environment, thereby adding value to the providers who bear the cost in providing VU region content and services and who may correspondingly expect an appropriate level of multiple-user engagement as a return on their investment, as well as for other users who wish to engage many others in a large virtual community.

For example, an informational or service-related region managed by a non-profit organization may desire or expect a given level of VU user engagement and participation, and commercial region providers may desire to engage in a given level of commercial transactions (e.g. number of sales, advertising exposures or paying subscribers) or achieve a level of marketing exposure among VU users. However, the solitary and unsupervised nature of a user's engagement with a given VU may present problems, for example enabling a user to engage in unsafe or inappropriate activities available within the VU.

SUMMARY OF THE INVENTION

Methods, services, program products and devices are provided for tracking avatar activities within a virtual universe domain. A proximity threshold of an avatar is defined with respect to proximity to an artifact located within a virtual universe domain. Activity by the avatar within the virtual universe domain is tracked, with activity data generated from the tracking. The activity data is analyzed to determine proximity of the avatar to the artifact within the proximity threshold, and a report is generated from the analyzing, the report noting a determined proximity of the avatar to the artifact within the proximity threshold. In one aspect, the report is provided to a supervisory entity.

In another aspect, service methods are provided comprising deploying applications configured to track avatar activities according to method steps described above, for example by a service provider who offers to implement, deploy, and/or perform functions for others. Still further, articles of manufacture comprising a computer usable medium having a computer readable program in said medium are provided. Such program code comprises instructions which, when executed on a computer system, cause the computer system to perform one or more method and/or process elements described above for tracking avatar activities. Moreover, systems, articles and programmable devices configured for performing one or more method and/or process elements of the current invention are also provided for tracking avatar activities, for example as described above.

BRIEF DESCRIPTION OF THE DRAWINGS

These and other features of this invention will be more readily understood from the following detailed description of the various aspects of the invention taken in conjunction with the accompanying drawings in which.

Figure 1:
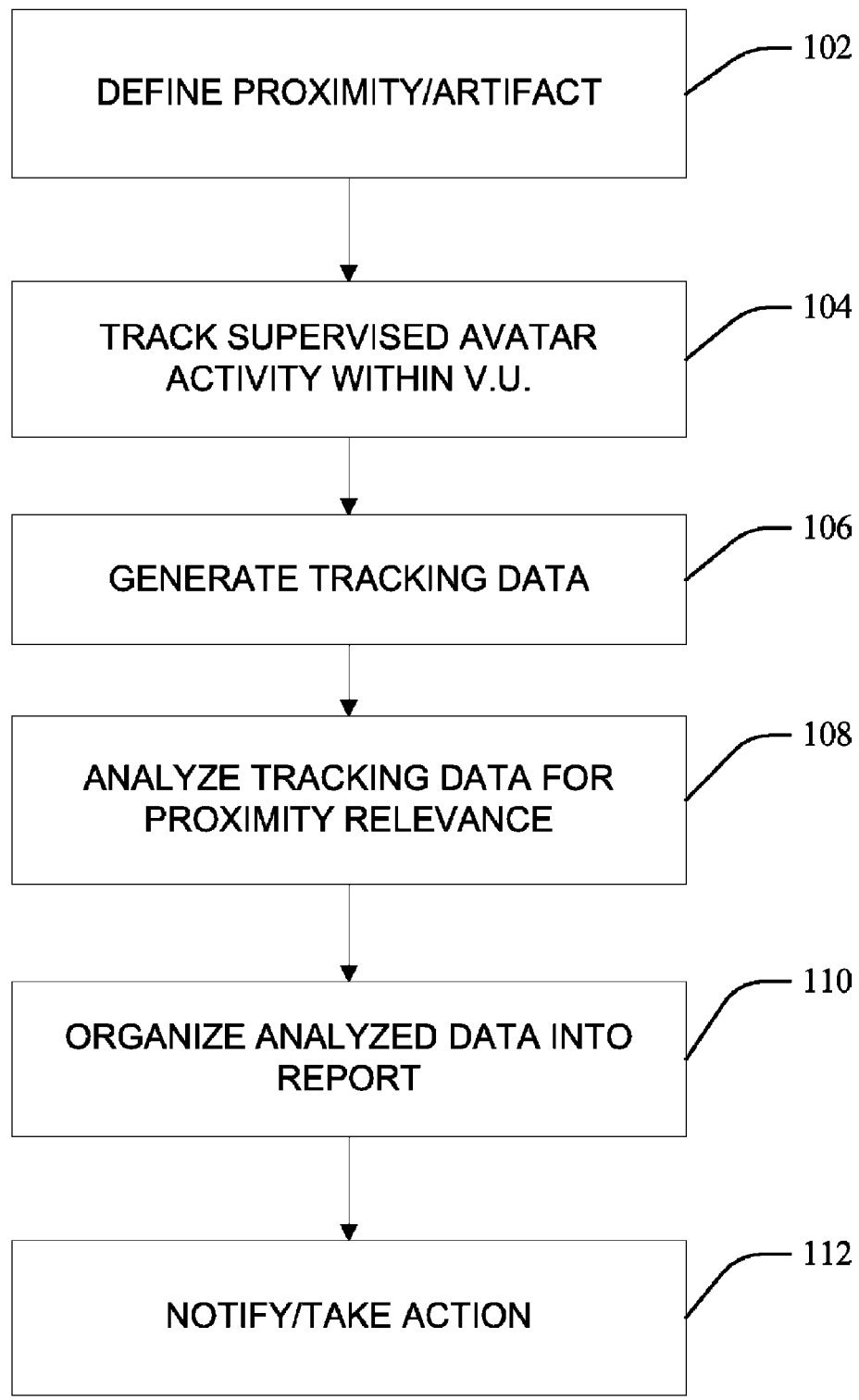
FIG. 1 is a flow chart illustrating a process and system for tracking avatar activities within a virtual universe domain according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections:
I. General Description; and
II. Computerized Implementation.

I. General Description

Referring now to FIG. 1, a method and process for tracking avatar activities within a virtual universe domain is provided. At 102 a proximity to or other engagement with a VU artifact of concern is defined with respect to a supervised user avatar, in one aspect the proximity and artifact defined to enable tracking of the supervised avatar's actions or activities within the VU with respect to the proximity to the artifact. At 104 activity of the supervised user avatar within the virtual universe domain is tracked. At 106 data is generated relative to the tracked activity or actions, and this data is analyzed at 108 to detect or determine data indicative of activities or actions by the supervised avatar within the defined proximity to the associate artifact defined at 102. In an optional step at 110, some embodiments further organize tracking data into one or more forms or formats appropriate for review and understanding by the user or other party or entity, for example a supervisory entity. At 112 an appropriate party is notified of the tracked data, for example by receiving a report generated at 110, and in particular notice may include notice data regarding specific activities within the defined proximity relative to an associated artifact as determined through analysis at 108. In some embodiments, notification at 112 may also comprise a VU provider, service provider or supervisory entity taking a direct action with respect to the supervised avatar or an associated VU client application, wherein some examples include notifying a third party or modifying a virtual universe client of a user avatar to actively stop or restrict the supervised user avatar from engaging in an activity within the defined proximity.

Prior art networked computer resource monitoring techniques are generally domain specific; for example, a supervised user's computer application client may be configured with a prior art firewall to prevent inappropriate web site or domain navigation. However, the prior art firewall is only effective with respect to a specific web site or VU domain, and generally based on the TCP ports involved. In contrast, methods and devices of the present invention (including as illustrated in FIG. 1 and described above) may be used by parents and other supervisory entities for monitoring their children's or supervised party's activities within a given VU with respect to one or more defined VU artifacts of concern.

Proximities to an artifact of concern may be defined in a wide variety of ways, as will be appreciated by those skilled in the respective arts. In one aspect, determining that a supervised avatar is engaging a forbidden or otherwise noteworthy artifact is a function of a proximity threshold, wherein an engagement or encounter with the artifact more proximate than a boundary value of the proximity threshold indicates an engagement event. For example, proximity may refer to a spatial or geographic location of an avatar within a VU relative to an artifact of concern, and in one example a proximity threshold may be defined as a displacement distance value, wherein a location of a supervised avatar proximate to an artifact of concern by less than the displacement distance threshold indicates a forbidden engagement of the artifact by the avatar. In another example, a parent may want to assure that a supervised child avatar does not enter a VU casino in order to prevent gambling activities, and thus a proximity to the casino may be defined with respect to an entry point such as a door, boundaries or outer wall of the casino as defined by geometric data Universally Unique Identifiers (UUID's) textual coordinates, wherein movement of the supervised avatar is tracked to determine whether the avatar has traversed the UUID's of the boundaries or doors.

Some VU regions considered otherwise generic or innocuous through VU ratings or common or conventional norms may also be associated with behaviors of concern: for example, a park area or general merchandise store region may acquire a reputation among VU users as a hang-out or meeting area for engaging other user avatars in order to purchase VU or real-world contraband. An open or outdoor area, such as a park or plaza bar, may also be frequented by avatars engaging in the public display of contraband or of adult-rated activities such as projecting adult or profane comic entertainment material or pop music including strong language or themes to the public of user avatars around them. Thus, according to the present invention, a proximity distance may be defined to keep a supervised avatar far enough away from such region artifacts that objectionable material cannot be heard or seen by the avatar; for example, a great enough sensory-limit proximity distance may be selected that a user's GUI cannot display an objectionable visual artifact within a proscribed region with a graphic resolution intelligible to the user. In some embodiments, the sensory-limit proximity distance may be defined as a function of the subject matter (with greater distances required to avoid exposure to signs and billboards), and distances may be defined with respect to VU-specific geographic attributes, for example a "VU-kilometer" at a normal (non-magnified) avatar perspective. Proximity thresholds may also comprehend regions, particularly when no other legitimate or permitted artifact or activity is known within a region or a VU-kilometer range of the same.

The avatars of other users or entities may also be identified as artifacts for exclusion from engagement with a supervised avatar, for example another user avatar known or predicted to exhibit inappropriate behaviors or offensive speech and dress, or who has engaged in bad financial dealings. In one aspect, a supervised avatar may be monitored for engagements with "griefer" avatar artifacts, users known or likely to intentionally cause grief to other VU users or to the VU environment. Griefers may be differentiated from typical VU users by behaviors in conflict with generally accepted objectives or norms of a given VU environment such as completing a game quest or making positive social contacts, instead negatively impacting the experience of other VU users without a legitimate objective. Examples of griefer activities include harassing or insulting other players and exploiting VU configurations to produce pranks or malicious and undesired environmental changes not intended or acceptable by other users or a VU provider or developer.

Thus, according to the present invention, a proximity to an artifact may be defined as a separation distance between avatars as well as a distance excluding a supervised avatar from engaging or partaking in activities in a region of concern, and tracking may determine if a supervised avatar is or has been located more proximate to a bad artifact than a specified engagement-prohibition threshold distance.

In another aspect of the present invention, a range-of-perception proximity may also be defined for application to an artifact. For example, to prevent exposure to projected or public utterances or graphic displays of lewd behavior or mannerisms from a known bad-avatar or VU region artifact, a proximity threshold may be specified, beyond which the supervised avatar is too far away to perceive the material of concern. This distance may be defined by a client computer display screen occupation; for example, a supervised avatar may not occupy the same screen display area as a bad artifact or an associated communication or media display within or by the bad artifact, in one aspect preventing a co-location of both a supervised avatar and an artifact of concern within the same client computer display screen area. In another aspect, if the supervised avatar and the artifact do appear within a common screen display, a proximity threshold may space the supervised avatar too far away to perceive an artifact; for example, images and text may be beyond a legible resolution range as defined by screen pixel values. A range-of-perception proximity may also be defined with respect to direct communications, for example receiving a chat message may violate a perception or communication proximity threshold.

VU personal items may also comprise artifacts of concern. Thus, an item may be defined with respect to an inventory proximity, with the nature of an item placed in an avatar's inventory or removed from an inventory relevant to proximity data tracking. The purchasing of items associated with a certain attribute may thus be tracked, including tracking item identity and dynamic attribute characteristics: for example, an otherwise benign image in an inventory may be altered or rendered into an inappropriate form as provided to another user avatar and thus relevant to an artifact proximity as altered. Items considered contraband or otherwise of concern may be identified and tracked through analyzing item descriptions, including dynamically tracking item descriptions that may change (for example from a time of purchase or other initial identification); item metadata; canonical names associated with the item; and social tags applied to items by other users.

Tracking information may be generated and sent to a supervisory party or even to the user of the avatar, and used to identify and determine benign as well as bad historical activity. In one aspect, tracking data and reports may help a user remember where he has been or what he has done in the past, for example allowing a user to query the data to determine if and/or when he has had a prior meeting with another user avatar, which may be useful in remembering an acquaintance and avoiding social embarrassment. Reporting or notifying may be performed via a variety of methods, including but not limited to e-mail, Really Simple Syndication (RSS) feeds, short message service (SMS) and instant messaging (IM) communication methods and applications, and may occur continually in real time or on periodic or event-responsive bases.

Reports may aggregate reporting activities in a reporting database, and may also involve using a daemon or similar process. A daemon is sometimes defined as a program or application that runs unobtrusively in the background rather than under the direction, knowledge or control of a user, and which awaits the occurrence of a specific event or condition for activation, for example a detection of a supervised avatar's activity exceeding a defined proximity threshold. Examples of actions or conditions that can trigger a supervisory daemon into activity also include passage of a specified time interval while the supervised avatar is in a presence-proximity of an undesirable other avatar or in a restricted/adult-oriented VU region; observing a file artifact uploading, downloading or saving to an inventory or other monitored data storage area; and receipt of an e-mail or a Web request made through a particular communication line by an avatar or user/entity of concern. Some daemon embodiments use "Extract, Transform, Load" (ETL) functions and metering paradigms, as will be apparent to one skilled in the art.

Implementation of tracking may be associated with a special user or account status. User-third party relationships may be determinative during VU account registrations, and thus tracking/monitoring configurations may be established responsive to identifying a parent-children relationship of two VU accounts with the parent's user account designated as the administrator of the child's VU account. User-third party relationships may also be designated and realized by a referential link in a database. More particularly, selection of a reference or referential link enables access to other data associated with the link and located in another location, for example in another database or another database location.

In one aspect, a parent or other responsible party may ensure that a supervised child user uses only an authorized avatar (one that has an authoritative third party figure associated with it) within a given VU by controlling access to the VU, for example only allowing access through a URL that acts as a proxy, and further requiring the user to log into the VU through the URL using the authorized avatar ID. In some embodiments, a supervisory user may register computer Media Access Control (MAC) addresses with the tracking service, wherein a MAC address may be defined as a quasi-unique identifier assigned to a network adapter or network interface card (NIC) for identification as a node within a network. Thus, a supervisor may monitor the behavior of supervised avatars that run an associated VU client application on their workstations. A MAC address-to-VU administrator link may also be realized by a referential link in a database. In one aspect, a supervisory entity tracking service may send tracking data to supervisors or other third parties with regard to supervised-avatar visits to MAC addresses for which tracking has been requested.

VU artifacts, including items, regions/locations and other avatars, may be qualitatively evaluated to identify restricted activities and proximities with respect to the artifacts. For example, entertainment media or passive environmental items viewed by the user avatar may be determined to be restricted or prohibited artifacts through analysis of social tags applied by other VU users to the items or to places used for viewing/accessing the items, as well as through analysis of creator-applied ratings or tags assigned to a given item, region or structure. Image recognition applications, such as for example Marvel™, may also be used (MARVEL is a trademark of IBM Corporation in the United States, other countries, or both). Tags may also be detected or determined through filtering of conversations or ambient media streams. Other avatar interactions may also be monitored and analyzed, for example including parsing or filtering conversations between other avatars relevant through regional co-location or other indicia with respect to a monitored/supervised avatar.

More particularly, filtering may contemplate methods and systems that detect the presence of key terms or phrases within text communications, as well as tags and metatag data. Metadata may be defined as meaning "data about other data," and search engines are known to use metatags to help determine the content and value of an artifact, for example with respect to webpage content. Metatag data may comprise an optional line of hyper-text markup language (HTML) code in a head section of a web document, the metatag's actual content providing descriptive information about the page, and further this descriptive information often not displayed by a search engine browser. Accordingly, according to the present invention metatag data associated with an artifact may be analyzed to determine whether the artifact is of concern or otherwise relevant to a specified proximity threshold.

It will also be appreciated that parsing may refer to analyzing input in a specific computer language against the formal grammar of the language, often to validate the input or create an internal representation for use in subsequent processing, as well as analyzing and describing grammatical structures of a sentence in comprehending the meaning of a sentence or term therein: thus parsing may be understood generally as analyzing text items within text communications, as well as tags and metatag data, in order to track activities according to the present invention. Other communications remote in time and place from the monitored/supervised avatar may also be tracked and analyzed, including chat and other communication transcripts determined as relevant to the monitored/supervised avatar or a location visited thereby.

Figure 2:
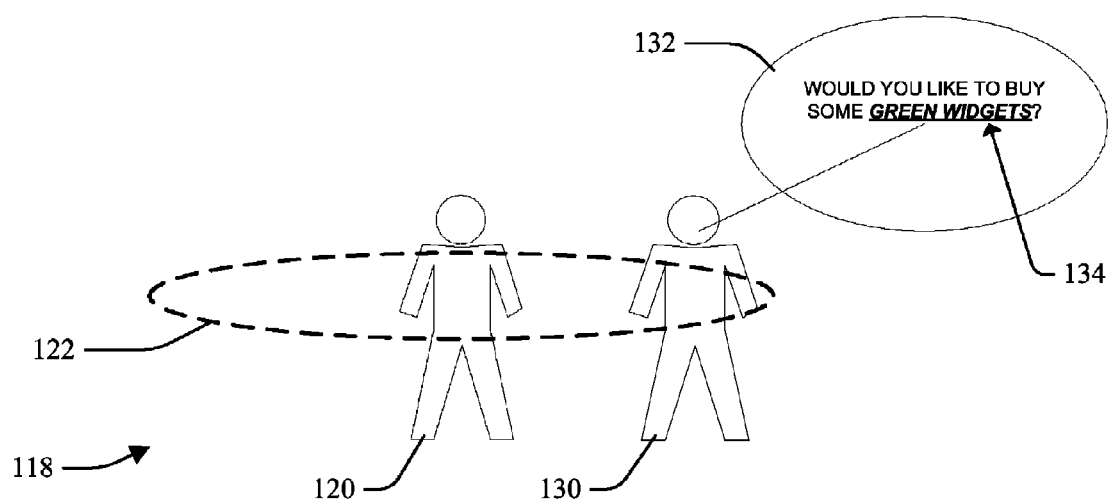
FIG. 2 is a block diagram illustration of an engagement of an artifact by an avatar tracked according to the present invention.

FIG. 2 provides an illustration of an avatar/artifact engagement tracked according to the present invention within a virtual universe domain 118, for example pursuant to a method of process of FIG. 1 as described above. A supervised avatar 120 is illustrated in proximity to a second avatar 130, and more particularly the second avatar 130 is proximate to the supervised avatar 120 within a proximity threshold 122 defined about the supervised avatar 120. Thus, if the second avatar 130 is identified as an artifact or concern, for example as a griefer 130, then the present illustrated engagement would be determined and reported as a proximate artifact engagement as described above.

In another aspect, a chat, text or other communication 132 from the second avatar 130 illustrated in FIG. 2 may be analyzed for artifact terms. In the present example, the term "green widget" 134 may refer to a subject matter of concern, and thus a process or system according to the present invention, for example as described above, may parse the communication 132 and determine the occurrence of the artifact term 134, resulting in a proximate artifact engagement determined and reported as described above.

Avatar tracking may be invoked (e.g. turned on) manually, for example by a selection means provided by a graphical user interface; or it may be automatically invoked, for example whenever a monitored/supervised avatar or user logs on or leaves a specified VU home or company location or when an avatar enters a certain designated/prohibited VU building or region.

Engagement of restricted artifacts in violation of a proximity threshold may result in a variety of actions. A supervisory entity may be notified via a graphical user interface (GUI) prompt, a page or a telephone call, and other appropriate notifications will be apparent to one skilled in the art. The supervised avatar may also be directly notified, for example by a GUI prompt stating "You are a entering a restricted area."

The VU client of a monitored/supervised avatar may also directly restrict the avatar from entering a restricted area rather than simply warning the avatar from doing so; for example, the monitored-avatar may be automatically teleported or transported to another region.

It will also be appreciated that distinguishing bad behavior (for example, griefer behavior) from more benign behavior may be subtle and VU-dependent. Behaviors displayed or otherwise engaged in publicly may be acceptable in one VU environment but clearly unacceptable in another, or they may become unacceptable as a given VU environment matures or evolves. Thus, in one aspect, bad avatar behavior definitions, as well as other artifact-of-concern definitions, may be dynamic and updateable, and other negative artifacts and attributes suitable for use with the present invention will also be apparent to one skilled in the art. Artifacts relevant to activity tracking and associated activity proximities may also be user defined, or they may be defined and provided by others. Thus, a group of parents may together associate a region of a VU with a behavioral attribute of concern; in one example, votes by parents or other users with supervisory status may associate a VU park area as a "known contraband provider hangout," and thus the presence of a child's avatar may be specifically tracked with respect to the area.

Dynamically updating bad artifact and proximity data may also comprise requesting or receiving data and updates from other supervisory entities and third parties and using the updated data in the processes described above. Thus, a supervisory entity may specify other VU administrators, groups or supervisory entities for sharing data, in one aspect designating third parties that they would like to receive or inherit region information from in order to use the data in identifying artifacts and associated activity proximities for tracking. In some embodiments a client may be offered a choice of a plurality of updating entities for updating artifact data or proximity threshold data, wherein in response to choosing a proffered updating entity artifact data or proximity threshold data is dynamically updated with update data received from the chosen updating entity.

Avatar tracking data may be monitored at different levels of granularity. For example, positional information may be generated every minute or every time a user teleports, flies, or moves a specified threshold distance value. Information may also be generated every time an item is added to or removed/displayed/used from an avatar's inventory. In one implementation, a daemon process may regularly poll a supervised avatar for current location information and store this information for subsequent data transmittals or report generation. Compiling and analyzing tracking data may comprise a variety of aggregating and packaging methodology. For example, tracking information may be presented as a list of VU region names, a list of names of avatars that came within a defined proximity radius of a supervised avatar, or as a map showing the supervised avatar's traversals in a virtual universe domain.

According to the present invention, organizations, parents and other authorized third parties may also register with a service provider who provides supervisory entity services, for example tracking an avatar and providing tracking data reporting in exchange for fees paid to the service provider. In some examples, third parties may get periodic reports as to what form of content is being accessed by supervised avatars. In another aspect, supervisory entities may also monitor inappropriate use or download of content within a VU or from a VU to a domain outside the VU, and to facilitate such monitoring some supervisory entities may make use of metadata tags on VU items. Metadata tags may indicate the nature of items (tag examples include adult material, contains explicit lyrics, contains confidential data, etc.), and thus in one example if an item is tagged "adult" an alert may be triggered to supervisory entities and third parties and/or a download prevented.

Not all item makers may put appropriate tags on their items, nor may social tags applied by other users be accurate. To overcome tag deficiencies, supervisory entities may also use a variety of methodology to review and analyze VU item content and make qualitative restricted content determinations with respect to VU artifacts, including directly assessing VU content by human or automated image analysis methodology. Some embodiments may incorporate other services and service providers into restricted content determinations.

An "artificial-artificial-intelligence" application or service may also be used in which an automated or GUI interface application uses actual humans to examine an item and make a decision as to appropriateness. Although live human analysis may be labor-intensive and more expensive than automated processes, parents and other third parties may find the value-added by using human analyzers worth the extra time and expense, and in particular for monitored/supervised avatar which may require a higher standard of care such as minor children who have evidenced prior improper use of VU resources. Thus, in one artificial-artificial-intelligence embodiment, a monitored/supervised child avatar attempting to download an item within a VU domain triggers scanning and analysis of the item by a Mechanical Turk® application (MECHANICAL TURK is a trademark of Amazon.com, Inc. in the United States and/or other countries) in response to a remote procedure provided below:

```
read (item);
itemContainsAdultmaterial = callMechanicalTurk(item);
if (itemContainsAdultmaterial == FALSE) {
  acceptItem;
}
else {
  rejectItem;
}
```

Figure 3:
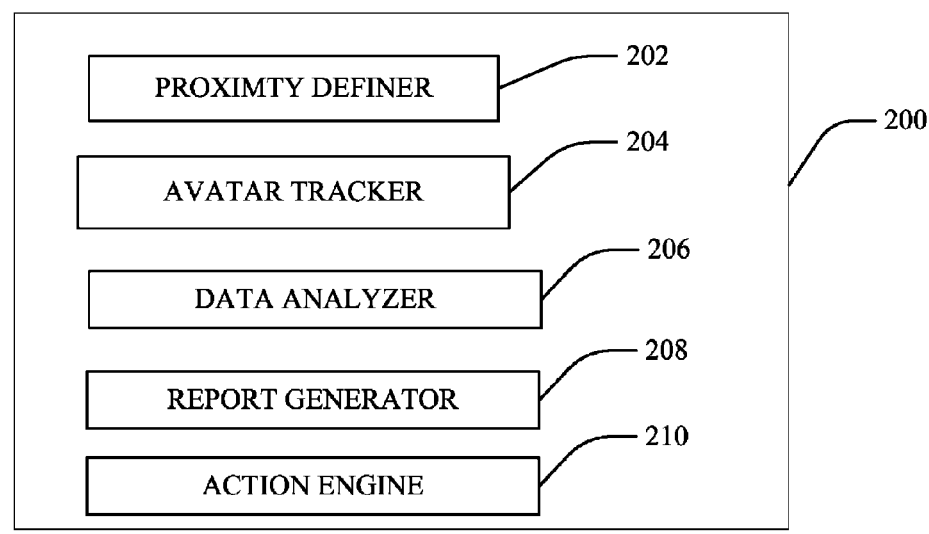
FIG. 3 is a block diagram illustration of a virtual universe client device configured to track avatar activities within a virtual universe domain according to the present invention.

Other analysis components may also be utilized, as will be appreciated by one skilled in the art. FIG. 3 illustrates a logic machine 200 configured to monitor avatar activities within a virtual universe domain for use with a virtual universe client or provider application according to the present invention. The logic machine 200 comprises a proximity definition component 202 configured to define proximity values relevant to VU artifacts of concern with respect to actions and activities of a monitored user avatar and an avatar tracker component 204 configured to monitor avatar activity data within the virtual universe domain as a function of the defined artifacts and proximities. A data analyzer component 206 is configured to analyze the tracking data, and in particular with respect to activity exceeding proximity limits or thresholds or other data observations relevant to defined artifacts and proximities. A report generator component 208 is configured to generate reports with regard to supervised user avatar actions and activity, and in particular to provide notification of activity relevant to the defined artifacts and proximities. An action component 210 may optionally be provided, configured to take an appropriate action as a function of determining occurrences within tracking data of activity exceeding proximity thresholds, for example by notifying a third party or modifying a virtual universe client of the user avatar to stop or restrict an associated activity.

II. Computerized Implementation

Figure 4:
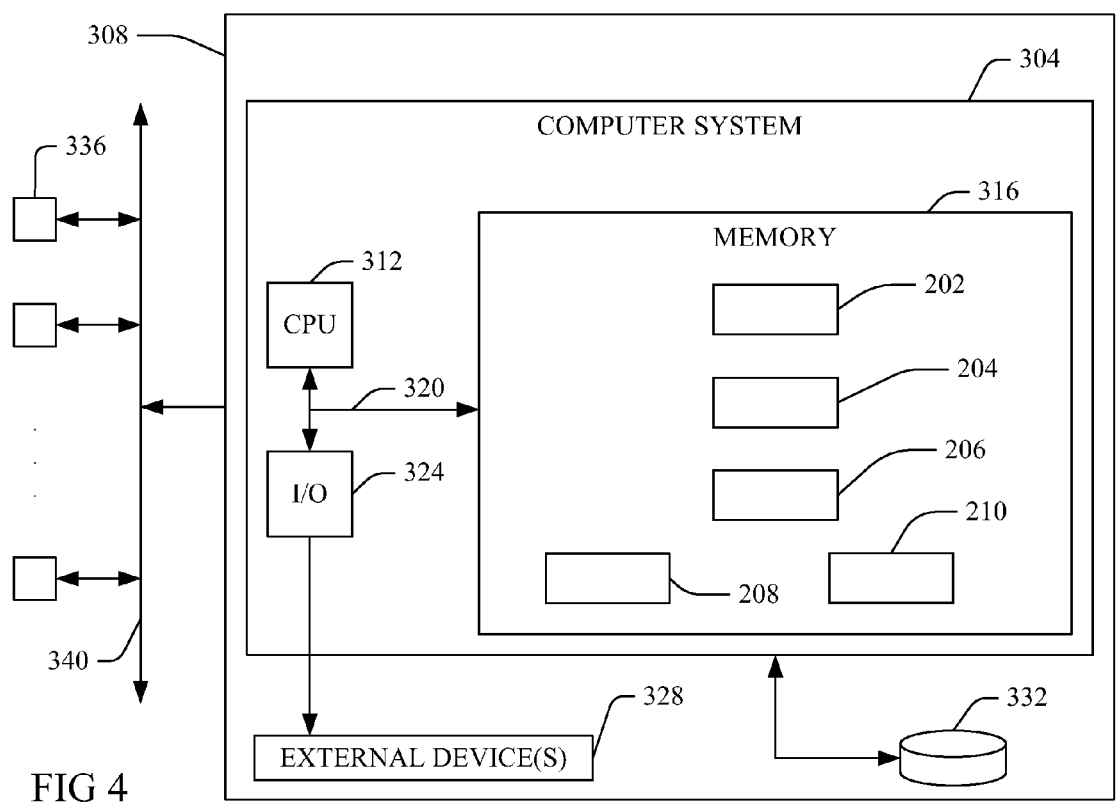
FIG. 4 is a block diagram illustrating an exemplary computerized implementation of a system and method for tracking avatar activities within a virtual universe domain according to the present invention.

The present invention may be implemented using conventional software tools and methods applicable to virtual universes, for example within a stand-alone VU application, or as a plug-in to an existing VU application. The system and mechanisms described could be implemented in a hosting system or grid for a virtual universe or in client software for the virtual universe installed on a user's personal computer or other programmable device. Referring now to FIG. 4, an exemplary computerized implementation includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the present invention, including the methods, processes and devices/systems illustrated in the FIGS. 1-3 and described herein, including the proximity definition component 202, the avatar tracker component 204, the data analyzer component 206, the report generator component 208 and the action component 210, which are stored in memory 316 and/or storage system 332. It is to be appreciated that two or more, including all, of the components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware. To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 4 can be included in computer system 304. Moreover, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to practice an embodiment according to the present invention, including the methods, processes and devices/systems illustrated in the Figures and described herein. To this extent, the computer-readable/useable medium includes program code that implements each of the various process steps of the invention.

It is understood that the terms "computer-readable medium" or "computer useable medium" comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.).

Still yet, computer infrastructure 308 is intended to demonstrate that some or all of the components of implementation could be deployed, managed, serviced, etc. by a service provider who offers to implement, deploy, and/or perform the functions of the present invention, including methods, processes and devices/systems according to the present invention as illustrated in the Figures and described herein, for example by licensing methods and browser or application server technology according to the present invention to an internet service providers (ISP) or cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the invention, and in return the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for tracking avatar activities within a virtual universe domain, comprising:

defining a permissible proximity threshold of an avatar which symbolizes a user who is accessing the virtual universe domain with respect to a proximity of the avatar to a specified artifact of concern within a virtual universe domain screen display of a computer virtual universe client application of the user;

tracking geographic positioning activity by the avatar within the virtual universe domain screen display generating activity data from the geographic positioning tracking;

analyzing the activity data to determine an engagement event whenever an engagement of the avatar with the specified artifact is more proximate than the permissible proximity threshold;

generating a report from the analyzing, the report noting each occurrence of the engagement event; and notifying a supervisory entity if the generated report notes an occurrence of the engagement event;

wherein the specified artifact visually conveys objectionable image or text material to a viewer, the defined permissible proximity threshold is a virtual universe spatial perception threshold distance to the specified artifact beyond which the objectionable image or text material is unintelligible within a legible resolution range defined by screen pixel values of a graphic resolution of a virtual universe client application screen display of a user of the avatar, and the analyzing the activity data comprises determining a proximity of the avatar to the specified artifact within a common screen display and determining the engagement event if the specified artifact is more proximate to the visual artifact than the spatial perception threshold distance within the screen display.

2. The method of claim 1 wherein generating the report comprises aggregating a list of at least one of a name of a region visited by the avatar within the virtual universe domain during the engagement event, and a name of another avatar determined spatially proximate to the avatar within the proximity threshold during the engagement event; and the reporting further comprising noting an association of the specified artifact with each of the at least one listed region name and the listed another avatar name.

3. The method of claim 2, wherein the reporting comprises generating a map showing traversals of the avatar associated with the engagement event.

4. The method of claim 1, wherein the artifact is a plurality of specified artifacts comprising a second specified item, the method further comprising:
defining the proximity threshold to comprise a location of the second item within an inventory of the avatar; and
the analyzing the activity data comprising determining an adding of the second item to the avatar's inventory; and
determining the engagement event if the second item has been added to the avatar's inventory.

5. The method of claim 4, further comprising identifying the item as the artifact by analyzing at least one of metatag data associated with the item, an item description, a canonical name associated with the item, and a social tag applied to the item by another user.

6. The method of claim 1, further comprising registering a media access control address; and
wherein the generating the report further comprises noting if the engagement event occurred during a visit by the user to the registered media access control address.

7. The method of claim 6, wherein registering the media access control address comprises providing a referential link in a database.

8. The method of claim 1, further comprising at least one of a virtual universe domain provider and the supervisory entity modifying a virtual universe client of the avatar to restrict the avatar from engaging in an activity associated with the determined proximity of the avatar to the artifact within the proximity threshold.

9. The method of claim 8, wherein modifying the virtual universe client of the avatar comprises further preventing a co-location of the avatar with the specified artifact within the common screen display area.

10. The method of claim 1, wherein the artifact is a plurality of specified artifacts comprising a specified region defined within the virtual universe, wherein avatars located within the specified region engage in activities forbidden to the avatar, and wherein the specified region has an entry point comprising a door, a boundary or an outer wall of the region defined by geometric data universally unique identifier textual coordinates;
wherein the defined permissible proximity threshold further comprises the entry point;
wherein the determining the engagement event comprises determining the engagement event if the analyzing the activity data determines a movement of the avatar traversing the entry point to visit the specified region.

11. The method of claim 10, further comprising:
specifying a text item and another avatar within the plurality of specified artifacts;
the defined permissible proximity threshold further prohibiting a direct communication of the specified text item between the avatar and the specified another avatar;
the analyzing the activity data further comprising at least one of parsing and filtering text communications engaged in by the avatar; and
the determining the engagement event further comprising determining the engagement event in response to the analyzing the activity data noting an occurrence of the specified text item in a direct communication between the avatar and the specified another avatar by the at least one of the parsing and the filtering of the text communications.

12. A method for providing a service for tracking of avatar activities within a virtual universe domain, comprising:
providing a computer infrastructure comprising a processing unit, a memory, a computer readable storage device and a network interface in communication with a virtual universe domain, wherein the computer infrastructure processing unit when executing program instructions on the memory that are stored on the computer readable storage device is configured to:
define a permissible proximity threshold of an avatar which symbolizes a user who is accessing the virtual universe domain with respect to a proximity of the avatar to a specified artifact of concern within a virtual universe domain screen display of a virtual universe computer client application of the user;
track geographic positioning activity by the avatar within the virtual universe domain screen display;
generate activity data from the geographic positioning tracking;
analyze the activity data to determine an engagement event whenever an engagement of the avatar with the specified artifact is more proximate than the permissible proximity threshold;
generate a report from the analyzing, the report noting each occurrence of the engagement event; and
notify a client of activity tracking services if the generated report notes an occurrence of the engagement event;
wherein the specified artifact visually conveys objectionable image or text material to a viewer, the defined permissible proximity threshold is a virtual universe spatial perception threshold distance to the specified artifact beyond which the objectionable image or text material is unintelligible within a legible resolution range defined by screen pixel values of a graphic resolution of a virtual universe client application screen display of a user of the avatar, and the analyzing the activity data comprises determining a proximity of the avatar to the specified artifact within a common screen display and determining the engagement event if the specified artifact is more proximate to the visual artifact than the spatial perception threshold distance within the screen display.

13. The method of claim 12, wherein the computer infrastructure processing unit is further configured, when executing the program instructions on the memory that are stored on the computer readable storage device, to generate the report by aggregating a list of at least one of a name of a region visited by the avatar within the virtual universe domain during the engagement event, and a name of another avatar determined spatially proximate to the avatar within the proximity threshold during the engagement event; and
wherein the report further notes an association of the specified artifact with each of the at least one listed region name and the listed another avatar name.

14. The method for providing tracking of claim 12, wherein the specified artifact is a plurality of specified artifacts comprising a second specified item, and wherein the computer infrastructure processing unit is further configured, when executing the program instructions on the memory that are stored on the computer readable storage device, to:
define the proximity threshold as a location of the second item within an inventory of the avatar;

analyze the activity data to determine the proximity of the avatar to the second item within the proximity threshold if the second item is added to the avatar's inventory; and identify the second item as the specified artifact by analyzing at least one of metatag data associated with the second item, an item description, a canonical name associated with the second item, and a social tag applied to the second item by another user.

15. The method of claim 12, wherein the computer infrastructure processing unit is further configured, when executing the program instructions on the memory that are stored on the computer readable storage device, to modify a virtual universe client of a user of the avatar to prevent a co-location of the avatar with the specified artifact within the common screen display area.

16. The method of claim 12, wherein the processing unit is further configured, when executing the program instructions on the memory that are stored on the computer readable storage device, to:

offer the user by client a choice of a plurality of updating entities for updating at least one of data of the specified artifact and data of the proximity threshold; and in response to the user choosing at least one of the plurality of updating entities, dynamically update the at least one of the specified artifact data and the proximity threshold data with update data received from the chosen at least one updating entity.

17. A computer program product for tracking avatar activities within a virtual universe domain, the computer program product comprising:

a computer readable storage device;

first program instructions to define a permissible proximity threshold of an avatar who is accessing the virtual universe domain with respect to a proximity of the avatar to a specified artifact of concern within a virtual universe domains screen display of a computer virtual universe client application of the user;

second program instructions to track geographic positioning activity by the avatar within the virtual universe domain and generate activity data from the geographic positioning tracking;

third program instructions to analyze the activity data to determine an engagement event whenever an engagement of the avatar with the specified artifact is more proximate than the permissible proximity threshold, generate a report from the analyzing, the report noting each occurrence of the engagement event, and notify a supervisory entity if the generated report notes an occurrence of the engagement event;

wherein the specified artifact visually conveys objectionable image or text material to a viewer, the defined permissible proximity threshold is a virtual universe spatial perception threshold distance to the specified artifact beyond which the objectionable image or text material is unintelligible within a legible resolution range defined by screen pixel values of a graphic resolution of a virtual universe client application screen display of a user of the avatar, and the analyzing the activity data comprises determining a proximity of the avatar to the specified artifact within a common screen display and determining the engagement event if the specified artifact is more proximate to the visual artifact than the spatial perception threshold distance within the screen display; and wherein the first, second and third program instructions are stored on the computer readable storage device.

18. The computer program product of claim 17, wherein the specified artifact is a plurality of specified artifacts comprising a second specified item, and wherein the third program instructions are further to:

define the proximity threshold as a location of the second item within an inventory of the avatar;

analyze the activity data to determine the proximity of the avatar to the second item within the proximity threshold if the second item is added to the avatar's inventory; and identify the second item as the specified artifact by analyzing at least one of metatag data associated with the second item, an item description, a canonical name associated with the second item, and a social tag applied to the second item by another user.

19. The computer program product of claim 18, wherein the second program instructions are further to analyze the activity data by at least one of parsing and filtering text communications engaged in by the avatar with another specified avatar for a specified text item; and wherein the third program instructions are further to define the permissible proximity threshold by further prohibiting a direct communication of the specified text item between the avatar and the specified another avatar; parse or filtering text communications engaged in by the avatar; and determine the engagement event in response to the parsing or the filtering of the text communications indicating an occurrence of the specified text item in a direct communication between the another specified avatar and the avatar.

20. A programmable device comprising:

a processing unit;

a memory in communication with the processing unit;

a computer readable storage device comprising program instructions stored therein; and a network interface in communication with the processing unit and a virtual universe domain;

wherein the processing unit when executing the program instructions stored on the computer readable storage device causes the programmable device to perform a method comprises:

define a permissible proximity threshold of an avatar who is accessing the virtual universe domain with respect to a proximity of the avatar to a specified artifact of concern within a virtual universe domain screen display of a computer virtual universe client application of a user;

track geographic positioning activity by the avatar within the virtual universe domain screen display;

generate activity data from the geographic positioning tracking;

analyze the activity data to determine an engagement event whenever an engagement of the avatar with the specified artifact within the screen display is more proximate than the permissible proximity threshold;

generate a report from the analyzing, the report noting each occurrence of the engagement event; and notify a supervisory entity if the generated report notes an occurrence of the engagement event;

wherein the specified artifact visually conveys objectionable image or text material to a viewer, the defined permissible proximity threshold is a virtual universe spatial perception threshold distance to the specified artifact beyond which the objectionable image or text material is unintelligible within a legible resolution range defined by screen pixel values of a graphic resolution of a virtual universe client application screen display of a user of the avatar, and the analyzing the activity data comprises determining a proximity of the avatar to the specified artifact within a common screen display and determining the engagement event if the specified artifact is more proximate to the visual artifact than the spatial perception threshold distance within the screen display.

21. The programmable device of claim 20, wherein the specified artifact is a plurality of specified artifacts comprising a second specified item, and wherein the processing unit is further configured, when executing the program instructions on the memory that are stored on the computer readable storage device, to:

define the proximity threshold as a location of the second item within an inventory of the avatar;

analyze the activity data to determine the proximity of the avatar to the second item as within the proximity threshold if the second item is added to the avatar's inventory; and identify the second item as the specified artifact by analyzing at least one of metatag data associated with the second item, an item description, a canonical name associated with the second item, and a social tag applied to the second item by another user.

22. The programmable device of claim 20, wherein the processing unit is further configured, when executing the program instructions on the memory that are stored on the computer readable storage device, to:

analyze the activity data by at least one of parsing and filtering text communications engaged in by the avatar with another specified avatar for a specified text item;

define the permissible proximity threshold by further prohibiting a direct communication of the specified text item between the avatar and the specified another avatar; and determine the engagement event in response to a parsing or the filtering of the text communications of the avatar indicating an occurrence of the specified text item in a direct communication between the another specified avatar and the avatar.

* * * * *